US008380903B2

(12) United States Patent
Williamson et al.

(10) Patent No.: US 8,380,903 B2
(45) Date of Patent: *Feb. 19, 2013

(54) ADMINISTERING THE POLLING OF A NUMBER OF DEVICES FOR DEVICE STATUS (75) Inventors: Nicholas M. Williamson, Cary, NC (US); Yin Jun Xu, Shanghai (CN); Pu Yp Yang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,000

(22) Filed: Apr. 9, 2012

(65) Prior Publication Data

US 2012/0198108 A1    Aug. 2, 2012

Related U.S. Application Data (63) Continuation of application No. 12/570,881, filed on Sep. 30, 2009, now Pat. No. 8,244,943.

(51) Int. Cl.
*G06F 13/00* (2006.01)
(52) U.S. Cl. ...................... 710/109; 710/220
(58) Field of Classification Search .......... 710/109, 710/220
See application file for complete search history.

(56) References Cited

U.S. PATENT DOCUMENTS

| 5,201,053 | A | 4/1993 | Benhase et al. |
| 6,353,869 | B1 | 3/2002 | Ofer et al. |
| 2009/0073889 | A1 | 3/2009 | Radulescu |
| 2011/0078352 | A1 | 3/2011 | Williamson et al. |

OTHER PUBLICATIONS

Watts et al.; Planning and Installing the IBM E Server X3 Architecture Servers; IBM Redbooks; Jan. 2006; pp. 1-244; First Edition; IBM Corporation; US.
IBM Systems; IBM Management Processor Command-line Interface Utility User's Guide; Jul. 2006; pp. 1-82; Fourth Edition; International Business Machines Corporation; US.
Office Action, U.S. Appl. No. 12/570,881, Jan. 13, 2012, pp. 1-9.
Notice of Allowance, U.S. Appl. No. 12/570,881, Apr. 3, 2012, pp. 1-5.

*Primary Examiner* — Glenn A Auve
(74) *Attorney, Agent, or Firm* — Edward J. Lenart; Cynthia G. Seal; Biggers & Ohanian, LLP (57) ABSTRACT

Administering the polling of a number of devices for device status including determining whether a task identification for polling the device is in the delayed polling queue; if the task identification for polling the device is not in the delayed polling queue, determining whether the task identification for polling the device is in the immediate polling queue; if the task identification for polling the device is in the immediate polling queue; calculating a new time interval for polling the device in dependence upon a predetermined base period and a random selection of a time offset, wherein the time offset is within a predetermined range; calculating a next polling time for polling the device in dependence upon the current time and the new time interval; inserting the task identification in the delayed polling queue in dependence upon the next polling time.

20 Claims, 6 Drawing Sheets

ADMINISTERING THE POLLING OF A NUMBER OF DEVICES FOR DEVICE STATUS

CROSS-REFERENCE TO RELATED APPLICATION

This application is a continuation application of and claims priority from U.S. patent application Ser. No. 12/570,881, filed on Sep. 30, 2009.

BACKGROUND OF THE INVENTION

1. Field of the Invention

The field of the invention is data processing, or, more specifically, methods, apparatus, and products for administering the polling of a number of devices for device status.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Currently data centers house many computers which may be monitored either locally or remotely for various errors. In many cases, errors occur in the computers of such data centers which are not automatically reported to a system administrator through an error notification. Although such errors are not reported, in many cases diagnostic light emitting diodes ('LEDs') on the computers themselves may display a notification of the error. As such, for a remote administrator to determine the status of such a computer that is not reporting errors, the system administrator may be required to either poll the computer for errors or poll the computer for the current configuration of LEDs identifying the error. In the administration of data centers housing many computers, polling computers for status too frequently can consume too many resources of the system administrator, while polling too infrequently can lead to errors occurring without correction and therefore limiting the resources of the data center.

SUMMARY OF THE INVENTION

Administering the polling of a number of devices for device status including maintaining an immediate polling queue and a delayed polling queue; selecting a device for polling; determining whether a task identification for polling the device is in the delayed polling queue; if the task identification for polling the device is in the delayed polling queue, selecting a next device for polling; if the task identification for polling the device is not in the delayed polling queue, determining whether the task identification for polling the device is in the immediate polling queue; if the task identification for polling the device is not in the immediate polling queue, inserting the task identification for polling the device in the next position in the immediate polling queue; if the task identification for polling the device is in the immediate polling queue; calculating a new time interval for polling the device in dependence upon a predetermined base period and a random selection of a time offset, wherein the time offset is within a predetermined range; calculating a next polling time for polling the device in dependence upon the current time and the new time interval; inserting the task identification in the delayed polling queue in dependence upon the next polling time.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
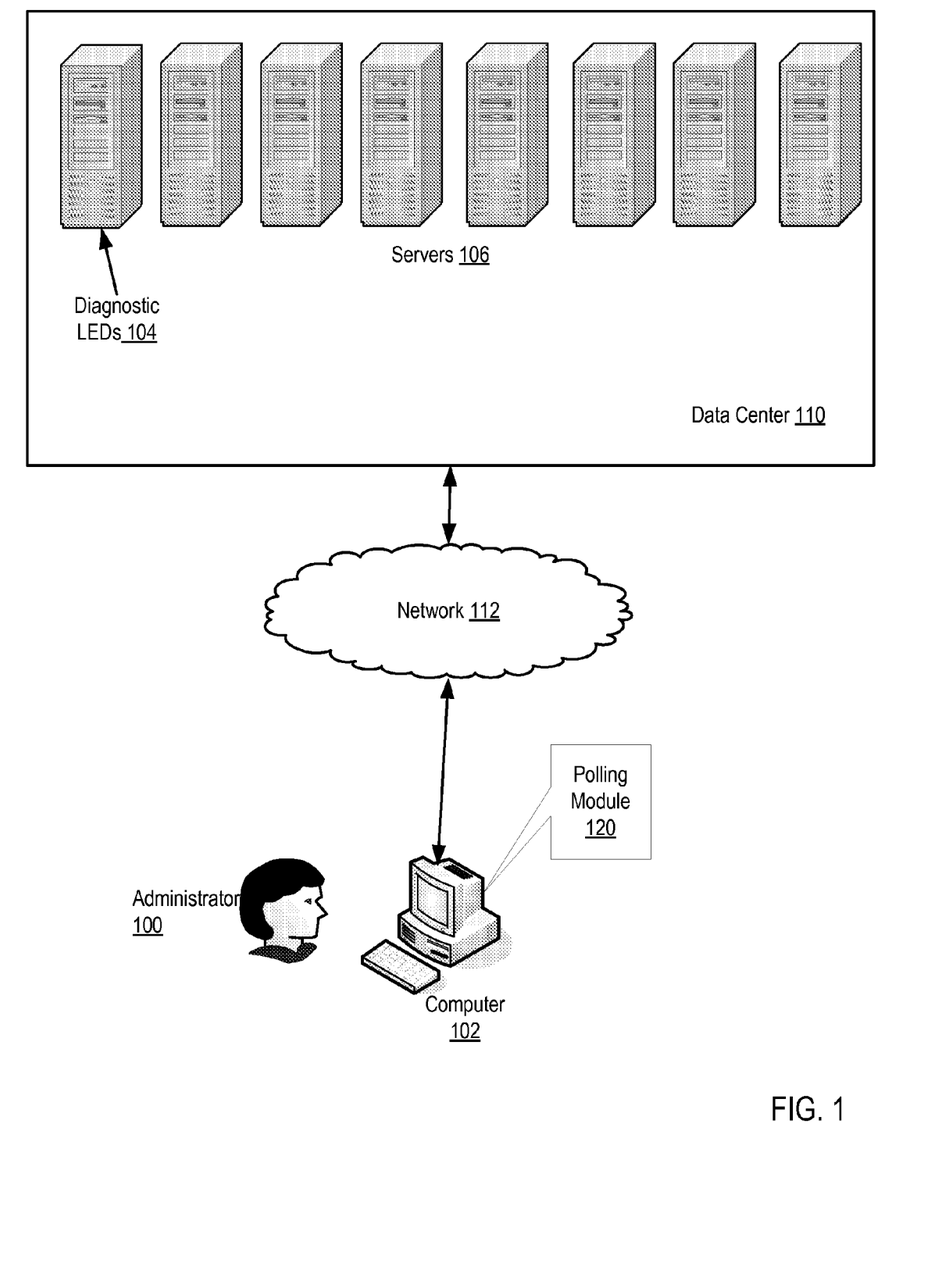
FIG. 1 sets forth a network diagram of a system for administering the polling of a number of devices for device status according to embodiments of the present invention.

Exemplary methods, apparatuses, and products for administering the polling of a number of devices for device status in accordance with the present invention are described with reference to the accompanying drawings, beginning with FIG. 1. FIG. 1 sets forth a network diagram of a system for administering the polling of a number of devices for device status according to embodiments of the present invention. The system of FIG. 1 includes a data center (110) coupled for data communications through a network (112) to a computer (102) for a system administrator (100) that has installed upon it a polling module (120) capable of administering the polling of a number of devices for device status in accordance with embodiments of the present invention. A data center is a facility used for housing a large amount of computer and communications equipment typically maintained by an organization for the purpose of handling the data necessary for its operations. The data center (110) of FIG. 1 includes a number of servers (106). Each of the servers (106) of the data center includes diagnostic LEDs (104) physically incorporated into the servers (106). The diagnostic LEDs provide through unique color sequences error notifications. When errors occur that result in error notifications embodied in unique color sequences of the LEDs, the server may or may not send an error notification message to an administrator (100) supervising the data center. If no message is sent to the system administrator, without polling the server or the diagnostic LEDs, the system administrator is unaware of the error.

The polling module (120) of FIG. 1 is coupled for data communications to the servers (106) of the data center (110) and is capable of administering the polling of a number of devices for device status in accordance with embodiments of the present invention. The polling module (120) of FIG. 1 is capable of maintaining an immediate polling queue and a delayed polling queue; selecting a device for polling; and determining whether a task identification for polling the device is in the delayed polling queue. If the task identification for polling the device is in the delayed polling queue, the polling module of FIG. 1 is capable of selecting a next device for polling. If the task identification for polling the device is not in the delayed polling queue, the polling module of FIG. 1 is capable of determining whether the task identification for polling the device is in the immediate polling queue. If the task identification for polling the device is not in the immediate polling queue, the polling module of FIG. 1 is capable of inserting the task identification for polling the device in the next position in the immediate polling queue. If the task identification for polling the device is in the immediate polling queue, the polling module of FIG. 1 is capable of calculating a new time interval for polling the device in dependence upon a predetermined base period and a random selection of a time offset, wherein the time offset is within a predetermined range, calculating a next polling time for polling the device in dependence upon the current time and the new time interval; and inserting the task identification in the delayed polling queue in dependence upon the next polling time.

The polling module (120) of FIG. 1 is capable administering the immediate polling queue by selecting, from the immediate polling queue, the task identification for polling the device and polling the device for device status without delay. The polling module (120) therefore iteratively selects each task identification for polling the next device from the immediate polling queue and polls that device without delay.

The polling module (120) of FIG. 1 is also capable administering the delayed polling queue by selecting, from the delayed polling queue, the task identification for polling the device and polling the device for device status at the calculated next polling time. The polling module (120) therefore polls each device having a task identification in the delayed polling queue at a calculated polling time.

The polling module (120) of FIG. 1 is also capable of administering the polling of a number of devices for device status in response to a received error notification from one or more of the servers (106) of the data center (110). The polling module of FIG. 1 is capable of receiving an error notification from one of the devices, and in response to receiving the error notification: selecting a next device for polling; determining whether a task identification for polling the next device is in the immediate polling queue; if the task identification for polling the next device is in the immediate polling queue, selecting another next device for polling; and if the task identification for polling the next device is not in the immediate polling queue, inserting the task identification in the next position in the immediate polling queue. The polling module of FIG. 1 is also capable of determining whether the task identification for polling the next device is in the delayed polling queue and if the task identification for polling the device is in the delayed polling queue, removing the task identification from the delayed polling queue. If the task identification for polling the device is not in the delayed polling queue, the polling module of FIG. 1 is capable of calculating a new time interval for polling the device in dependence upon a predetermined base period and a random selection of a time offset, wherein the time offset is within a predetermined range, calculating a next polling time for polling the device in dependence upon the current time and the new time interval, and inserting the task identification in the delayed polling queue in dependence upon the next polling time.

The status of each of the devices polled may then be provided to the system administrator (100) such as by displaying on a graphical user interface ('GUI') a report including device identifications and status of the devices. Administering the polling of a number of devices for device status allows for immediate polling of devices in the case of a received error notification and also timed delayed polling for device status to monitor devices when no error notification is received.

In the example of FIG. 1, the servers (106) may include many devices which may be polled for device status by the polling module. One example of a device in FIG. 1 that may be polled for device status is a set of diagnostic LEDs. The diagnostic LEDs may be polled for their current configuration. The current configuration of the diagnostic LEDs indicates the status of other components of the server and some such configuration indicates an error in the server. By polling the diagnostic LEDs for their status, errors occurring the server may be identified that are not otherwise reported automatically to a system administrator. Other devices whose device status may be determined through polling and the polling of which may be administered according to embodiments of the present invention include the servers themselves, components of the server, and others as will occur to those of skill in the art. The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Administering the polling of a number of devices for device status in accordance with the present invention is generally implemented with computers, that is, with automated computing machinery. For further explanation, therefore, FIG. 2 sets forth a block diagram of automated computing machinery comprising an exemplary computer (152) useful in administering the polling of a number of devices for device status according to embodiments of the present invention. The computer (152) of FIG. 2 includes at least one computer processor (156) or 'CPU' as well as random access memory (168) ('RAM') which is connected through a high speed memory bus (166) and bus adapter (158) to processor (156) and to other components of the computer (152).

Figure 2:
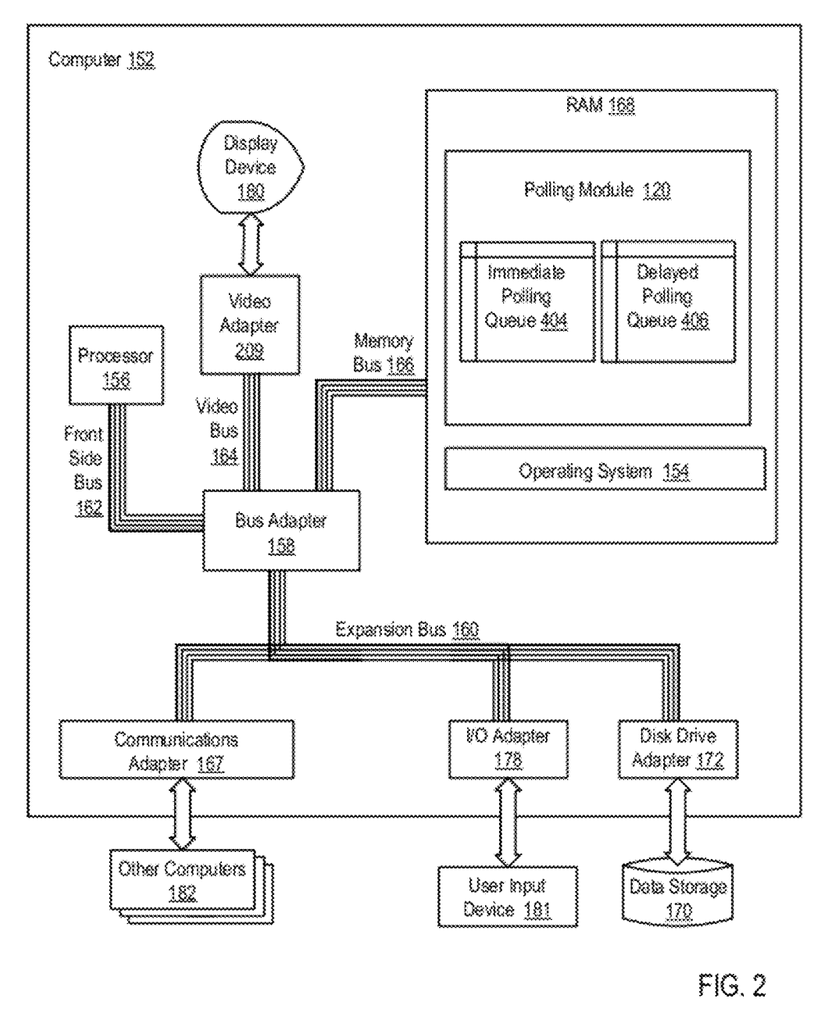
FIG. 2 sets forth a block diagram of automated computing machinery comprising an exemplary computer useful in administering the polling of a number of devices for device status according to embodiments of the present invention.

Stored in RAM (168) is a polling module (120), a module of computer program instructions for administering the polling of a number of devices for device status according to embodiments of the present invention. The polling module (120) of FIG. 2 is capable of maintaining an immediate polling queue (404) and a delayed polling queue (406); selecting a device for polling; and determining whether a task identification for polling the device is in the delayed polling queue. If the task identification for polling the device is in the delayed polling queue, the polling module of FIG. 2 is capable of selecting a next device for polling. If the task identification for polling the device is not in the delayed polling queue, the polling module of FIG. 2 is capable of determining whether the task identification for polling the device is in the immediate polling queue. If the task identification for polling the device is not in the immediate polling queue, the polling module of FIG. 2 is capable of inserting the task identification for polling the device in the next position in the immediate polling queue. If the task identification for polling the device is in the immediate polling queue, the polling module of FIG. 2 is capable of calculating a new time interval for polling the device in dependence upon a predetermined base period and a random selection of a time offset, wherein the time offset is within a predetermined range, calculating a next polling time for polling the device in dependence upon the current time and the new time interval; and inserting the task identification in the delayed polling queue in dependence upon the next polling time.

The polling module (120) of FIG. 2 is capable administering the immediate polling queue (404) by selecting, from the immediate polling queue, the task identification for polling the device and polling the device for device status without delay. The polling module (120) therefore iteratively selects each task identification for polling the next device from the immediate polling queue and polls that device without delay.

The polling module (120) of FIG. 2 is also capable administering the delayed polling queue (406) by selecting, from the delayed polling queue, the task identification for polling the device and polling the device for device status at the calculated next polling time. The polling module (120) therefore polls each device having a task identification in the delayed polling queue and a calculated time.

The polling module (120) of FIG. 2 is also capable of administering the polling of a number of devices for device status in response to a received error notification from one or more of the servers (106) of the data center (110). The polling module of FIG. 2 is capable of receiving an error notification from one of the devices, and in response to receiving the error notification: selecting a next device for polling; determining whether a task identification for polling the next device is in the immediate polling queue (404); if the task identification for polling the next device is in the immediate polling queue, selecting another next device for polling; and if the task identification for polling the next device is not in the immediate polling queue, inserting the task identification in the next position in the immediate polling queue. The polling module of FIG. 2 is also capable of determining whether the task identification for polling the next device is in the delayed polling queue (406) and if the task identification for polling the device is in the delayed polling queue, removing the task identification from the delayed polling queue. If the task identification for polling the device is not in the delayed polling queue, the polling module of FIG. 2 is capable of calculating a new time interval for polling the device in dependence upon a predetermined base period and a random selection of a time offset, wherein the time offset is within a predetermined range, calculating a next polling time for polling the device in dependence upon the current time and the new time interval, and inserting the task identification in the delayed polling queue in dependence upon the next polling time.

Also stored in RAM (168) is an operating system (154). Operating systems useful in administering the polling of a number of devices for device status according to embodiments of the present invention include UNIX™, Linux™, Microsoft XP™, AIX™, IBM's i5/OS™, and others as will occur to those of skill in the art. The operating system (154) and polling module (120) in the example of FIG. 2 are shown in RAM (168), but many components of such software typically are stored in non-volatile memory also, such as, for example, on a disk drive (170).

The computer (152) of FIG. 2 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for administering the polling of a number of devices for device status according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 2 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 2 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 2 includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful for administering the polling of a number of devices for device status according to embodiments of the present invention include modems for wired dial-up communications, Ethernet (IEEE 802.3) adapters for wired data communications network communications, and 802.11 adapters for wireless data communications network communications.

Figure 3:
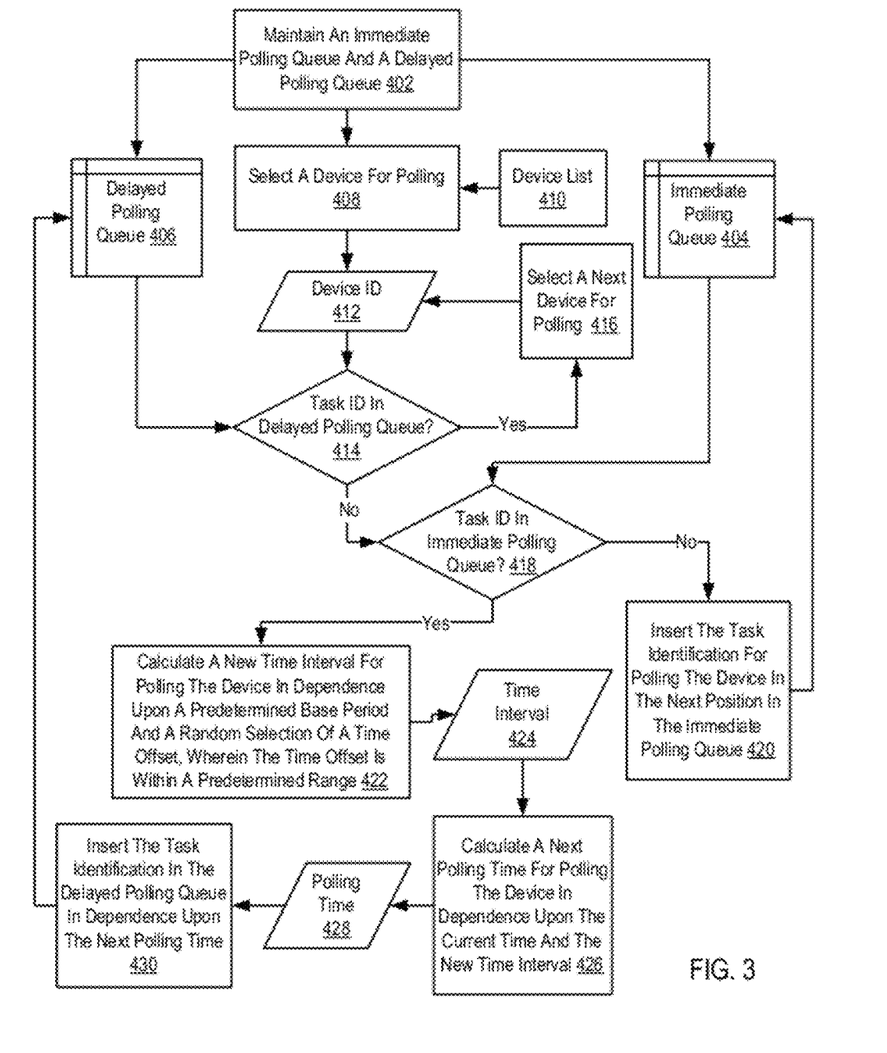
FIG. 3 sets forth a flow chart illustrating an exemplary method for administering the polling of a number of devices for device status according to embodiments of the present invention.

For further explanation, FIG. 3 sets forth a flow chart illustrating an exemplary method for administering the polling of a number of devices for device status according to embodiments of the present invention. The method of FIG. 3 includes maintaining (402) an immediate polling queue (404) and a delayed polling queue (406). As mentioned above, an immediate polling queue (404) includes task identifications for polling devices without delay and a delayed polling queue includes task identification for polling devices at calculated polling times.

The method of FIG. 3 also includes selecting (408) a device (412) for polling. Selecting (408) a device (412) for polling may be carried out by traversing a list of device IDs of devices to be polled one by one and selecting the next device ID on the list for polling.

The method of FIG. 3 also includes determining (414) whether a task identification for polling the device (412) is in the delayed polling queue (406). A task identification is a data structure identifying a device ID of a device to be polled and an identification of the type status of the device to be polled, such as current LED configuration, power status, an so on. In the delayed polling queue the task identification also includes a polling time calculated according to embodiments of the present invention. Determining (414) whether a task identification for polling the device (412) is in the delayed polling queue (406) may be carried out by comparing the device ID in each of the task identifications in the delayed polling queue with an identification of the selected device for a match.

If the task identification for polling the device is in the delayed polling queue (406), the method of FIG. 3 includes selecting (416) a next device for polling. Selecting (416) a next device for polling may be carried out by identifying the next device ID on a list of device IDS of devices to be polled.

If the task identification for polling the device is not in the delayed polling queue (406), the method of FIG. 3 includes determining (418) whether the task identification for polling the device is in the immediate polling queue (404). Determining (418) whether the task identification for polling the device is in the immediate polling queue may be carried out by comparing the device ID in each of the task identifications in the immediate polling queue with an identification of the selected device for a match.

If the task identification for polling the device is not in the immediate polling queue (404), the method of FIG. 3 includes inserting the task identification for polling the device in the next position in the immediate polling queue (404). As mentioned above, devices identified in task identifications in the immediate polling queue are polled without delay.

If the task identification for polling the device is in the immediate polling queue (404), the method of FIG. 3 includes calculating (422) a new time interval (424) for polling the device in dependence upon a predetermined base period and a random selection of a time offset, wherein the time offset is within a predetermined range. A predetermined base period is a predetermined period of time selected as a reasonable period of time to poll a device given the unique situations of the devices to be polled. Such a predetermined base period is typically dependent upon the number of devices to be polled and the average period of time it takes to poll the device. For example, LED configuration of a server in one particular data center may be reasonably polled every fifteen minutes when the servers are providing important services whereas the LED configuration of other servers in other data centers may be reasonably polled once a day when those other servers are not providing important services. A time offset is a period of time within a predetermined range used to adjust the base period in calculating a new time interval. Such a predetermined range may be just a few seconds or may be longer depending upon the devices polled, the importance of status and other considerations. The time offset may be either positive or negative such that the new time interval may be longer or shorter that the predetermined base period.

Calculating (422) a new time interval (424) for polling the device in dependence upon a predetermined base period and a random selection of a time offset is carried out by randomly selecting an offset within the predetermined range and adding the randomly selected offset to the predetermined base period. For example, a new time interval for polling LED configuration of servers running important services may be calculated by adding a predetermined base period of fifteen minutes to a randomly selected time offset of 10 seconds which is in the predetermined range of one minute. In such an example, the new time interval so calculated is 910 seconds. In another example, a new time interval for polling LED configuration of servers running important services may be calculated by adding a predetermined base period of thirty minutes to a randomly selected time offset of negative two minutes which is in the predetermined range of six minutes. In such an example, the new time interval so calculated is 1680 seconds.

The method of FIG. 3 includes calculating (426) a next polling time (426) for polling the device in dependence upon the current time and the new time interval (424). Calculating (426) a next polling time (426) for polling the device in dependence upon the current time and the new time interval (424) may be carried out by adding the new time interval to the current time resulting in a next polling time.

The method of FIG. 3 also includes inserting (430) the task identification in the delayed polling queue (406) in dependence upon the next polling time. Inserting (430) the task identification in the delayed polling queue (406) in dependence upon the next polling time is carried out by inserting the task identification in the delayed polling queue after other task identifications having polling times before the calculated next polling time of the task identification for the device to be polled and before other task identifications having polling times after the calculated next polling time of the task identification for the device to be polled.

As mentioned above, administering the polling of a number of devices for device status according to embodiments of the present invention administers an immediate polling queue without delay. For further explanation, FIG. 4 sets forth a flow chart illustrating an exemplary method for administering the immediate polling queue. The method of FIG. 4 includes selecting (502), from the immediate polling queue (404), the task identification (504) for polling the device. Selecting (502), from the immediate polling queue (404), the task identification (504) for polling the device may be carried out by taking from the immediate polling queue task identifications in first-in-first-out order, last-in-first-out order or any other order without regard to time.

Figure 4:
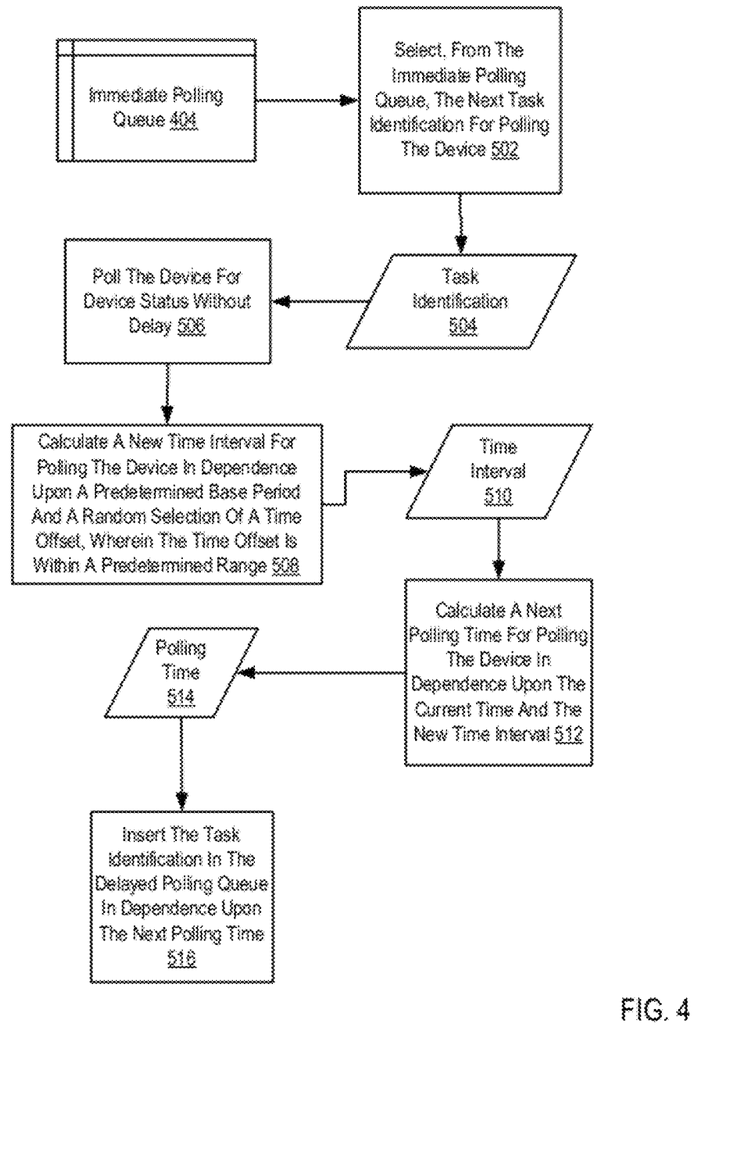
FIG. 4 sets forth a flow chart illustrating an exemplary method for administering an immediate polling queue in accordance with embodiments of the present invention.

The method of FIG. 4 includes polling (506) the device for device status without delay. Polling (506) the device for device status without delay may be carried out by querying without delay the device for a particular status of the device such as its current diagnostic LED configuration, current power status, or any other device status that will occur to those of skill in the art.

In some embodiments of the present invention, a pool of dedicated polling threads is maintained for polling devices. The number of polling threads in the pool may be dependent upon the number of devices to be polled, on average how long it takes to poll the device, a predetermined reasonable time period for the device and other factors as will occur to those of skill in the art.

After polling (506) the device for device status without delay, the method of FIG. 4 includes calculating (508) a new time interval (510) for polling the device in dependence upon a predetermined base period and a random selection of a time offset, wherein the time offset is within a predetermined range, calculating (512) a next polling time (514) for polling the device in dependence upon the current time and the new time interval (510) and inserting (516) the task identification in the delayed polling queue in dependence upon the next polling time. Calculating (508) a new time interval (510) for polling the device in dependence upon a predetermined base period and a random selection of a time offset, wherein the time offset is within a predetermined range, calculating (512) a next polling time (514) for polling the device in dependence upon the current time and the new time interval (510) and inserting (516) the task identification in the delayed polling queue in dependence upon the next polling time may be carried out as described above with reference to FIG. 3.

As mentioned above, administering the polling of a number of devices for device status according to embodiments of the present invention administers a delayed polling queue by polling devices at calculated next polling times. For further explanation, FIG. 5 sets forth a flow chart illustrating an exemplary method for administering a delayed polling queue in accordance with embodiments of the present invention. The method of FIG. 5 includes selecting (602), from the delayed polling queue, the task identification for polling the device. As mentioned above, task identifications may be inserted into the delayed polling queue in order of the next polling time identified in the task identification. As such, selecting (602), from the delayed polling queue, the task identification for polling the device may be carried out by selecting the task identification having a next polling time closest to the current time.

Figure 5:
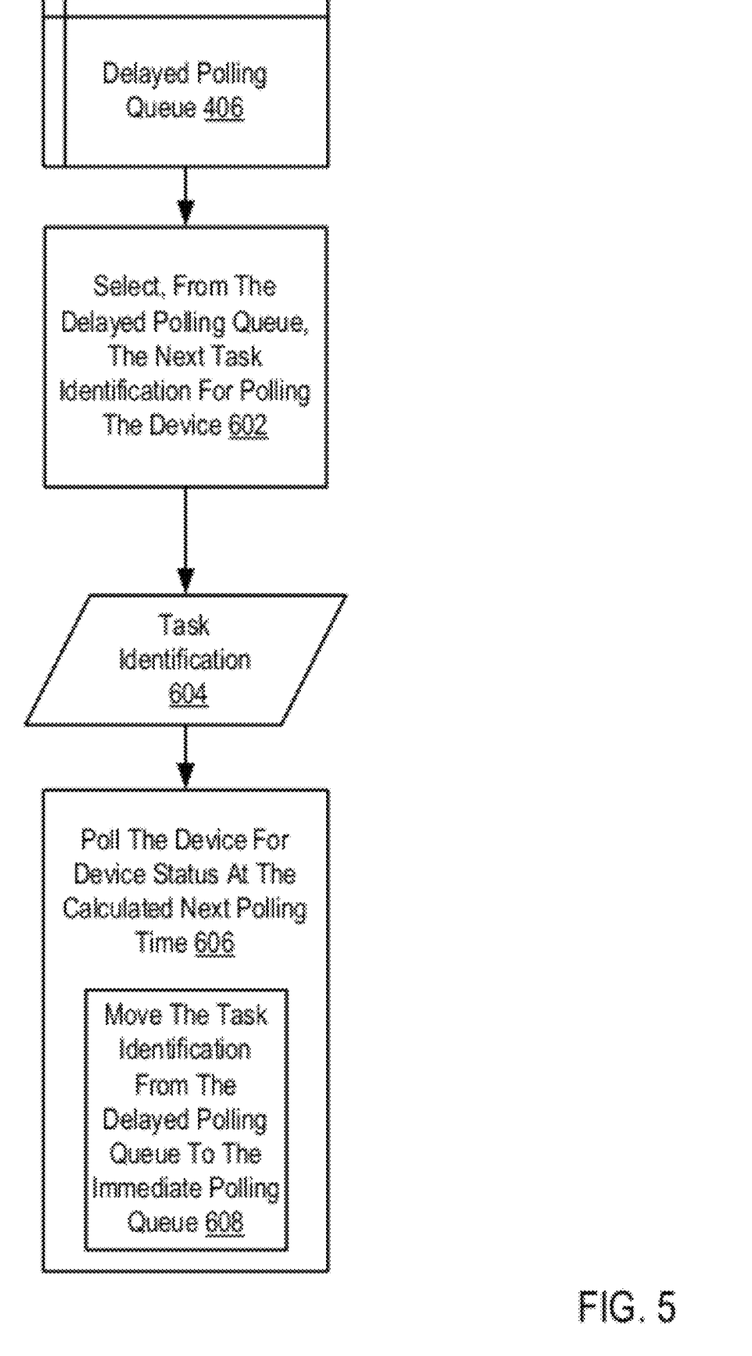
FIG. 5 sets forth a flow chart illustrating an exemplary method for administering a delayed polling queue in accordance with embodiments of the present invention.

The method of FIG. 5 includes polling (606) the device for device status at the calculated next polling time. Polling (606) the device for device status at the calculated next polling time according to the method of FIG. 5 includes moving may be carried out by moving (608) the task identification from the delayed polling queue to the immediate polling queue at the calculated next polling time for polling without delay. The task identification is then administered without delay according to the method of FIG. 4.

As mentioned above, in some situations devices may on their own motion send a notification when an error occurs. Often when an error notification is received from one of the devices other devices also are experiencing errors. When error notifications are received from one or more of the devices to be polled, administering the polling of a number of devices for device status according to embodiments of the present invention may administer the immediate polling queue and the delayed polling queue in additional ways. For further explanation, FIG. 6 sets forth a flow chart illustrating additional aspects of administering the polling of a number of devices for device status according to embodiments of the present invention. The method of FIG. 6 includes receiving (502) an error notification from one of the devices, and in response to receiving the error notification. Receiving an error notification from one of the devices may include receiving a message from a device identifying the device and identifying the error that occurred.

Figure 6:
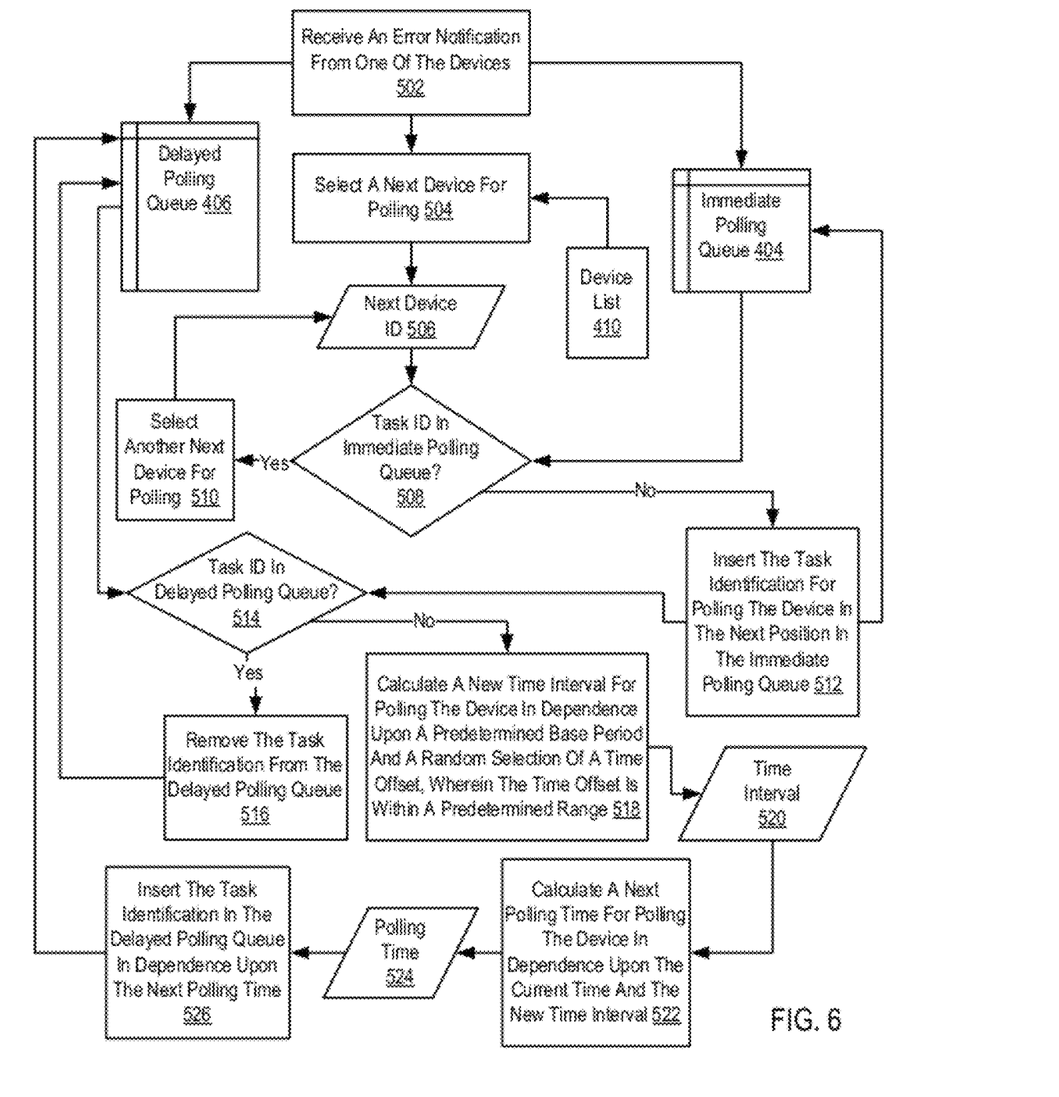
FIG. 6 sets forth a flow chart illustrating additional aspects of administering the polling of a number of devices for device status according to embodiments of the present invention.

The method of FIG. 6 includes selecting (504) a next device (506) for polling. Selecting (504) a next device (506) for polling may be carried out by traversing a list of device IDs of devices to be polled one by one and selecting the next device ID on the list for polling.

The method of FIG. 6 also includes determining (508) whether a task identification for polling the next device is in the immediate polling queue (404). Determining (508) whether a task identification for polling the next device is in the immediate polling queue (404) may be carried out by comparing the device ID in each of the task identifications in the immediate polling queue with an identification of the selected device for a match.

If the task identification for polling the next device is in the immediate polling queue (404), the method of FIG. 6 includes selecting (510) another next device for polling. Selecting another next device for polling may be carried out by identifying the next device ID on a list of device IDS of devices to be polled.

If the task identification for polling the next device (506) is not in the immediate polling queue (404), the method of FIG. 6 includes inserting (512) the task identification in the next position in the immediate polling queue (404). Inserting (512) the task identification in the next position in the immediate polling queue (404) may be carried out by inserting the task identification in a position in the immediate polling queue after the last task identification residing the immediate polling queue.

The method of FIG. 6 also includes determining (514) whether the task identification for polling the next device is in the delayed polling queue (406). Determining (514) whether the task identification for polling the next device is in the delayed polling queue (406) may be carried out by comparing the device ID in each of the task identifications in the delayed polling queue with an identification of the selected device for a match.

If the task identification for polling the device is in the delayed polling queue (406), the method of FIG. 6 includes removing (516) the task identification from the delayed polling queue (406). Removing (516) the task identification from the delayed polling queue (406) may be carried out by deleting the task identification.

If the task identification for polling the device is not in the delayed polling queue; the method of FIG. 6 includes calculating (518) a new time interval (520) for polling the device in dependence upon a predetermined base period and a random selection of a time offset, wherein the time offset is within a predetermined range, calculating (522) a next polling time for polling the device in dependence upon the current time and the new time interval (520), and inserting (526) the task identification in the delayed polling queue (406) in dependence upon the next polling time as discussed above with reference to FIG. 3.

Exemplary embodiments of the present invention are described largely in the context of a fully functional computer system for administering the polling of a number of devices for device status. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method of administering polling of a number of devices for device status, the computer comprising a computer processor, a computer memory operatively coupled to the computer processor, the computer memory having disposed within it computer program instructions that execute steps of the method, the method comprising:
   maintaining an immediate polling queue and a delayed polling queue;
   selecting a device for polling;
   determining whether a task identification for polling the device is in the delayed polling queue;
   if the task identification for polling the device is not in the delayed polling queue, determining whether the task identification for polling the device is in the immediate polling queue;
   if the task identification for polling the device is not in the immediate polling queue, inserting the task identification for polling the device in a next position in the immediate polling queue;
   if the task identification for polling the device is in the immediate polling queue:
   calculating a next polling time for polling the device; and
   inserting the task identification in the delayed polling queue in dependence upon the next polling time.

2. The method of claim 1 further comprising:
   selecting, from the immediate polling queue, the task identification for polling the device; and
   polling the device for device status without delay.

3. The method of claim 1 further comprising:
   selecting, from the delayed polling queue, the task identification for polling the device; and
   polling the device for device status at the calculated next polling time.

4. A computer-implemented method of administering polling of a number of devices for device status, the computer comprising a computer processor, a computer memory operatively coupled to the computer processor, the computer memory having disposed within it computer program instructions that execute steps of the method, the method comprising:
   receiving an error notification from one of the devices, and in response to receiving the error notification:
   selecting a next device for polling;
   determining whether a task identification for polling the next device is in an immediate polling queue;
   if the task identification for polling the next device is not in the immediate polling queue, inserting the task identification in a next position in the immediate polling queue;
   determining whether the task identification for polling the next device is in a delayed polling queue;
   if the task identification for polling the device is in the delayed polling queue, removing the task identification from the delayed polling queue;
   if the task identification for polling the device is not in the delayed polling queue:
   calculating a next polling time for polling the device; and
   inserting the task identification in the delayed polling queue in dependence upon the next polling time.

5. The method of claim 4 further comprising:
   selecting, from the immediate polling queue, a next task identification for polling the device; and
   polling the device for device status without delay.

6. The method of claim 4 further comprising:
   selecting, from the delayed polling queue, a next task identification for polling the device; and
   polling the device for device status at the calculated next polling time.

7. The method of claim 4 wherein the predetermined base period is dependent upon the number of devices to be polled and average period of time to poll the device.

8. The method of claim 4 wherein the devices comprise diagnostic Light Emitting Diodes.

9. An apparatus for administering polling of a number of devices for device status, the apparatus comprising a computer processor, a computer memory operatively coupled to the computer processor, the computer memory having disposed within it computer program instructions for:
   maintaining an immediate polling queue and a delayed polling queue;
   selecting a device for polling;
   determining whether a task identification for polling the device is in the delayed polling queue;
   if the task identification for polling the device is not in the delayed polling queue, determining whether the task identification for polling the device is in the immediate polling queue;
   if the task identification for polling the device is not in the immediate polling queue, inserting the task identification for polling the device in a next position in the immediate polling queue;
   if the task identification for polling the device is in the immediate polling queue:
   calculating a next polling time for polling the device; and
   inserting the task identification in the delayed polling queue in dependence upon the next polling time.

10. The apparatus of claim 9 wherein the computer memory also has disposed within it computer program instructions for:
    selecting, from the immediate polling queue, the task identification for polling the device; and
    polling the device for device status without delay.

11. The apparatus of claim 9 wherein the computer memory also has disposed within it computer program instructions for:
    selecting, from the delayed polling queue, the task identification for polling the device; and
    polling the device for device status at the calculated next polling time.

12. An apparatus for administering polling of a number of devices for device status, the apparatus comprising a computer processor, a computer memory operatively coupled to the computer processor, the computer memory having disposed within it computer program instructions for:
    receiving an error notification from one of the devices, and in response to receiving the error notification:
    selecting a next device for polling;
    determining whether a task identification for polling the next device is in an immediate polling queue;
    if the task identification for polling the next device is not in the immediate polling queue, inserting the task identification in a next position in the immediate polling queue;
    determining whether the task identification for polling the next device is in a delayed polling queue;
    if the task identification for polling the device is in the delayed polling queue, removing the task identification from the delayed polling queue;
    if the task identification for polling the device is not in the delayed polling queue:
    calculating a next polling time for polling the device; and
    inserting the task identification in the delayed polling queue in dependence upon the next polling time.

13. The apparatus of claim 12 wherein the computer memory also has disposed within it computer program instructions for:
   selecting, from the immediate polling queue, a next task identification for polling the device; and
   polling the device for device status without delay.

14. The apparatus of claim 12 wherein the computer memory also has disposed within it computer program instructions for:
   selecting, from the delayed polling queue, a next task identification for polling the device; and
   polling the device for device status at the calculated next polling time.

15. The apparatus of claim 12 wherein the predetermined base period is dependent upon the number of devices to be polled and average period of time to poll the device.

16. The apparatus of claim 12 wherein the devices comprise diagnostic Light Emitting Diodes.

17. A computer program product for administering polling of a number of devices for device status, the computer program product disposed in a recordable medium, the computer program product comprising computer program instructions capable of:
   maintaining an immediate polling queue and a delayed polling queue;
   selecting a device for polling;
   determining whether a task identification for polling the device is in the delayed polling queue;
   if the task identification for polling the device is not in the delayed polling queue, determining whether the task identification for polling the device is in the immediate polling queue;
   if the task identification for polling the device is not in the immediate polling queue, inserting the task identification for polling the device in a next position in the immediate polling queue;
   if the task identification for polling the device is in the immediate polling queue:
      calculating a next polling time for polling the device; and
      inserting the task identification in the delayed polling queue in dependence upon the next polling time.

18. The computer program product of claim 17 further comprising computer program instructions capable of:
   selecting, from the immediate polling queue, the task identification for polling the device; and
   polling the device for device status without delay.

19. The computer program product of claim 17 further comprising computer program instructions capable of:
   selecting, from the delayed polling queue, the task identification for polling the device; and
   polling the device for device status at the calculated next polling time.

20. A computer program product for administering polling of a number of devices for device status, the computer program product disposed in a recordable medium, the computer program product comprising computer program instructions capable of:
   receiving an error notification from one of the devices, and in response to receiving the error notification:
   selecting a next device for polling;
   determining whether a task identification for polling the next device is in an immediate polling queue;
   if the task identification for polling the next device is not in the immediate polling queue, inserting the task identification in a next position in the immediate polling queue;
   determining whether the task identification for polling the next device is in a delayed polling queue;
   if the task identification for polling the device is in the delayed polling queue, removing the task identification from the delayed polling queue;
   if the task identification for polling the device is not in the delayed polling queue:
   calculating a next polling time for polling the device; and
   inserting the task identification in the delayed polling queue in dependence upon the next polling time.

* * * * *